United States Patent
Greenwood (10) Patent No.: US 6,880,003 B2
(45) Date of Patent: *Apr. 12, 2005

(54) METHOD AND APPARATUS FOR EFFICIENT DATA BROWSING

(75) Inventor: Jon Michel Greenwood, Corona, CA (US)

(73) Assignee: Gateway, Inc., Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/751,147

(22) Filed: Jan. 2, 2004

(65) Prior Publication Data

US 2004/0143683 A1 Jul. 22, 2004

Related U.S. Application Data

(63) Continuation of application No. 09/591,796, filed on Jun. 12, 2000, now Pat. No. 6,675,212.

(51) Int. Cl.[7] ............................................. G06F 15/173
(52) U.S. Cl. ....................... 709/224; 709/217; 709/219; 709/203; 709/231; 709/235
(58) Field of Search ................................ 709/224, 217, 709/231–235, 203

(56) References Cited

U.S. PATENT DOCUMENTS

| | | | |
|---|---|---|---|
| 5,815,508 A | 9/1998 | Wadzinske et al. | |
| 5,870,769 A | * 2/1999 | Freund | 715/501.1 |
| 5,881,234 A | 3/1999 | Schwob | |
| 5,894,554 A | 4/1999 | Lowery et al. | |
| 5,907,681 A | 5/1999 | Bates et al. | |
| 5,931,904 A | 8/1999 | Banga et al. | |
| 5,933,490 A | 8/1999 | White et al. | |
| 5,941,957 A | 8/1999 | Ingrassia, Jr. et al. | |
| 5,944,795 A | 8/1999 | Civanlar | |
| 5,951,694 A | 9/1999 | Choquier et al. | |
| 5,983,262 A | 11/1999 | Kukkal | |
| 5,987,466 A | 11/1999 | Greer et al. | |
| 5,996,022 A | * 11/1999 | Krueger et al. | 709/247 |
| 5,999,526 A | * 12/1999 | Garland et al. | 370/352 |
| 6,185,586 B1 | * 2/2001 | Judson | 715/513 |
| 6,349,326 B1 | * 2/2002 | Lam | 709/203 |
| 6,366,947 B1 | * 4/2002 | Kavner | 709/203 |
| 6,393,526 B1 | * 5/2002 | Crow et al. | 711/137 |
| 6,405,240 B1 | * 6/2002 | Tsubone et al. | 709/203 |
| 6,438,592 B1 | * 8/2002 | Killian | 709/224 |
| 6,510,467 B1 | * 1/2003 | Behfar et al. | 709/233 |
| 6,598,075 B1 | * 7/2003 | Ogdon et al. | 709/204 |

OTHER PUBLICATIONS

PC World Online;FileWorld; file Description; http://www-.pcworld.com/fileworld/file description/0,1458,1712,00.html:.

* cited by examiner

Primary Examiner—Ario Etienne
Assistant Examiner—Abdullahi E. Salad
(74) Attorney, Agent, or Firm—Jeffrey A. Proehl; Leonard & Proehl (57) ABSTRACT

A method and apparatus for providing improved efficiency in data browsing is disclosed. Automatic continuation of a data browsing session is enabled, while a download of a requested data file, that has been temporarily delayed, is handled separately in a background process. This separate background process generates additional requests for the requested data file as needed, thereby overcoming delays caused by transient network traffic and also enabling automatic downloading of data files that are undeliverable when first requested. When the download of the requested data file is successfully completed, a notification is provided and the requested data file is made observable.

20 Claims, 7 Drawing Sheets

METHOD AND APPARATUS FOR EFFICIENT DATA BROWSING

REFERENCE TO RELATED APPLICATION

This application is a continuation of application Ser. No. 09/591,796, filed Jun. 12, 2000, now U.S. Pat. No. 6,675,212.

BACKGROUND OF THE INVENTION

1. Field of the Invention

The present invention relates generally to data browsing systems and, more particularly, to systems and methods for improving data browsing efficiency in computer implemented data browsing systems.

2. Related Art

Data browsing is a common form of information review. While conducting research in one text, an individual may come across a reference to another text, article or other source of information, which appears pertinent to the task at hand. The individual then retrieves the referenced text to review, while saving his place in the original text. While reviewing the referenced text, the individual can then repeat the process or return to the original text. In the traditional world of physical books and libraries, this data browsing process is labor intensive and time consuming.

With the development of computer networks and hyperlinked electronic data, data browsing has become simpler, faster and more effective. Hyperlinked data is data that includes additional information, which references a location of another data file or data object. By selecting a particular piece of hyperlinked data, such as by pointing to it with a cursor and pressing a button, a user of a data browsing system, causes the referenced data file or data object to be retrieved arid presented to the user. While the concept of hyperlinked data is applicable to many types of data retrieval systems, the most common application today is on the Internet and the World Wide Web.

The Internet is a computer network made up of nodes spanning the entire globe. A node can be a multi-purpose computer, a computer network, or any machine capable of communicating using Internet Protocol, such as routers, bridges and dumb terminals Host computers or networks of computers on the Internet allow easy access to electronic services and information. Hosts can be sponsored by a wide range of entities including, for example, universities, government organizations, commercial enterprises and individuals.

Internet information and services are made available to the public through servers running on Internet hosts. Although a server is, strictly speaking, the software that resides on a host, an Internet host is also commonly referred to as a server because this is the function it performs. An individual using a computer connected to the Internet can access a very large amount of information by running client software, which requests data from the large number of servers connected to the Internet.

Like most modern computer networks, the Internet is based on packet switching. Thus when a data file is sent over the Internet, it is broken up into segments, or "packets", of data, and each packet is handled separately. Each packet of data has its own routing information contained in a header.

As a system of linked computers, the Internet relies on networking protocols to function. Networking protocols facilitate communications between servers and requesting clients. Internet Protocol ("IP") is one such networking protocol. Computers on an IP network utilize unique ID codes, allowing each node on the network to be uniquely identified.

IP was developed during the Cold War with sponsorship from the United States military. It was designed to enable a communications network to function even during a nuclear war; thus it was designed to be robust. IP allows multiple routes between any two points, and has built in mechanisms to route data packets around damaged portions of the network. However, because there are multiple routes between two points and the fastest route can change over time (depending on variable factors such as the amount of traffic on the network), the packets that make up a particular data file may not all take the same route through the network and may not arrive at their destination in the order they were sent. In fact, some packets may be lost altogether due to difficulties with the network.

In part to solve this problem, additional network protocol layers are placed on top of IP. The layer placed just above IP is traditionally called the transport layer. A common example of a transport layer protocol is Transport Control Protocol ("TCP"). TCP allows the source and destination computers on an IP network to acknowledge receipt of packets, request retransmission of lost packets and put packets back in their proper order.

The World Wide Web ("Web") is based on the combination of a standardized hypertext script language for defining the semantic value of data, such as hypertext markup language ("HTML"), and a hypertext transfer protocol, such as "HTTP". HTTP is designed to run primarily over TCP/IP. HTTP uses the standard Internet setup, where a server issues the data and a client displays or processes it using a web browser. This data can be in many forms including text, pictures, sound and software. Because the Web uses hypertext (information that defines the semantic value of data with which it is associated), it is very easy to create hyperlinked data on the Web.

The Web provides access to information on the Internet, allowing a user to navigate Internet resources intuitively, using a graphical user interface, without specific knowledge of IP addresses and other specialized information. The Web comprises millions of data files, frequently referred to as "web pages", connected by hyperlinks. These web pages can be downloaded and displayed on a user's computer monitor. Hosts running web servers provide these web pages. Web server software is relatively simple and available on a wide range of computer platforms, including standard personal computers. Equally available is web browser software, which is used to request and display web pages and other types of data files to users. Thus the combination of the Internet, the Web and web browsers has created the largest and most comprehensive data browsing system known to date.

The growth of the Web has been exponential in recent years. More electronic data and hyperlinks are added to the Web every day. This exponential growth has turned the Internet into a vast library, enabling individuals to research a nearly endless number of subjects and ideas using this data browsing system. In fact, the ease with which the Web can be used to browse data, allowing a person to jump from one topic to a sub-topic to another topic and back, has given rise to the new term "web surfing." In essence, web surfing is data browsing in which the goal is to find interesting information instead of particular information.

Despite the easy access to information created by modern computer networks, there remains a significant problem with current data browsing systems. The problem derives from delays in data delivery. When an individual using a data browsing apparatus, such as a web browser running on a computer connected to the Internet, selects a hyperlink on a data page, the data browsing apparatus transmits a request for the data file associated with the selected hyperlink. If the requested data file is currently undeliverable, or if no response is received to the data request within a specified time, the data browsing apparatus displays an error message identifying the nature of the problem, thereby obscuring the data page that contains the hyperlink. Moreover, this error message is displayed even if the requested data file is only temporarily unavailable, such as when the server is currently handling its limit of requesting clients.

In addition, if the requested data file is deliverable, but that delivery is slow due to network traffic, the data browsing apparatus displays the data in the requested data file as it is received, thereby obscuring the data page that contains the hyperlink. Thus, traditional data browsing apparati interrupt the data browsing session whenever a requested data file is currently unavailable, such as when high network traffic causes a slow download, a lost data request or a busy server.

Some data browsing apparati allow the individual to request a data file via a hyperlink in a new instance of the apparatus' user interface. For example, most web browsers allow a user to right click on a hyperlink and select the option, "Open in New Window." However, this does not solve the problem. The new window is opened on top of the existing window, thereby obscuring the data page that contains the hyperlink until the user reselects the original window. Moreover, if the requested data file is currently undeliverable, or if no response is received to the data request within the specified time, an error message is displayed in the new window even though the requested data file may be only temporarily unavailable.

With web users and network traffic increasing exponentially, the likelihood that one will receive an error message associated with a lack of response to a data request or servers being too busy, unavailable, updating, etc. grows. Usually, these messages simply tell you to hit 'Refresh' again (i.e. manually re-request the data file) until the web site loads, but often this doesn't work right away, especially at crucial e-commerce periods such as Christmas. In addition, as network traffic and the sizes of data files increase, the likelihood that a requested data file will take a significant amount of time to download, thus interrupting a data browsing session, also grows.

Therefore, what is needed is a system and method for efficient data browsing that allows a user to automatically continue with a data browsing session, and automatically receive a requested data file, when the requested data file's download is temporarily delayed.

SUMMARY OF THE INVENTION

The present invention is directed toward a method and apparatus for efficient data browsing.

The present invention enables automatic continuation of a data browsing session when a download of a requested data file is temporarily delayed. Data requests are actively monitored for excessive delay in a download of a requested data file. When an excessive delay is detected, the nature of the delay is identified as either temporary or long term. When the delay is identified as temporary, the download of the requested data file is handled by a separate monitoring task, set to run in the background, while active control of the data browsing session is returned to a user, via a user interface displaying an originally-displayed data file.

According to one aspect of the present invention, a user is notified when a download has been backgrounded, thereby alerting the user that data browsing can continue and the requested data file will be presented as soon as it is downloaded. According to one aspect of the present invention, the separate monitoring task is performed in a separate instance of the user interface. This separate instance is readily available for viewing, but is initially placed below the active instance of the user interface displaying the originally-displayed data file.

The present invention enables automated generation of additional data requests for a requested data file when the data file is temporarily unavailable. Responses to data requests are actively monitored for indications that the requested data file is only temporarily unavailable. When such indications are found, an additional data request for the requested data file is automatically generated after a period of time. By repetition of this automated process, a temporarily unavailable data file is downloaded as soon as it becomes available.

According to one aspect of the present invention, the period of time varies between each additional data request, thereby minimizing excessive network traffic. According to yet another aspect of the present invention, additional data requests are generated for a requested data file that is slow to download, thereby improving delivery time when delivery is delayed due to transient network congestion. According to yet another aspect of the present invention, additional data requests are generated for a requested data file for which no response has been received, thereby enabling successful downloading despite short-lived network problems.

According to one aspect of the present invention, a user is notified once a requested data file's download, which was temporarily delayed, is complete. In this fashion, the present invention enriches the data browsing experience by eliminating the need to personally monitor the results of various requests for data files. Additionally, in a preferred embodiment of the separate user interface instance embodiment of the present invention, the notification aspect of the present invention brings the separate instance to the foreground and places it under active control of the user, thereby allowing browsing of the requested data file immediately upon completion of the download.

Further features and advantages of the invention as well as the structure and operation of various embodiments of the invention are described in detail below with reference to the accompanying drawings.

DETAILED DESCRIPTION OF THE INVENTION

The present invention is directed toward a system and method for improving data browsing efficiency in computer implemented data browsing systems. The present invention is disclosed and described herein in terms of a data browsing apparatus utilizing the Internet and the World Wide Web. Description in these terms is provided for ease of discussion only. After reading this description, it will become apparent to one of ordinary skill in the art how to implement the invention in alternative embodiments and alternative network environments. For example, alternative embodiments include a multi-purpose computer running a web browser, and a dumb terminal running library database browsing software. Alternative network environments include any "Future Net" which will likely encompass the functions now provided by today's Internet, cable and broadcast television, telephone communications and other linear and interactive business and telecommunications systems, and any collection of electronic devices connected by communication means so as to allow data retrieval and review. As such, the description of this example embodiment should not be construed to limit the scope and breadth of the present invention.

Figure 1:
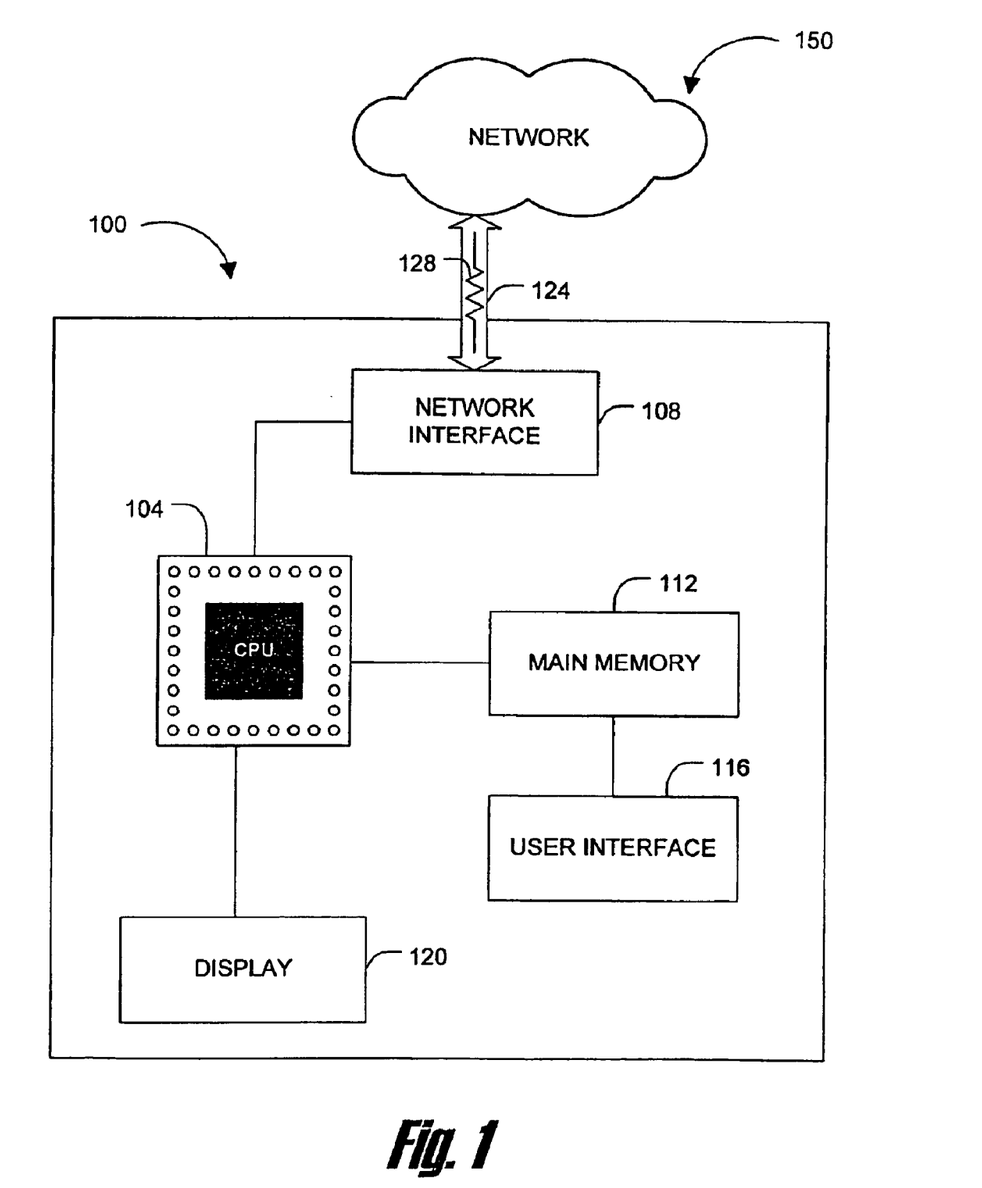
FIG. 1 is a block diagram depicting an exemplary data browsing apparatus connected with its operational environment according to one embodiment of the present invention.

FIG. 1 is a block diagram depicting an exemplary data browsing apparatus connected with its operational environment according to one embodiment of the present invention. Referring now to FIG. 1, a data browsing apparatus 100 is connected to a network 150, which in this example embodiment is the Internet, via a channel 124. This channel 124 carries signals 128 and can be implemented using wire or cable, fiber optics, a phone line, a cellular phone link, a radio frequency (RF) link, infrared interface (IR) or other communications channels. Signals 128 are data files requested by the data browsing apparatus 100, as well as communication protocol information used in obtaining the data files via network 150.

The data browsing apparatus 100 includes a central processor ("CPU") 104, a network interface 108, a main memory 112, a user interface 116 and a display 120. Network interface 108 provides a connection between the data browsing apparatus 100 and the network 150. Network interface 108 receives the signals 128, thereby providing the CPU 104 with access to data and code in a manner that is well-known and commonly used in computer systems. In this example embodiment, network interface 108 includes control logic allowing requesting and receiving of data files via network 150 and downloading of user interface 116 upon power up of the data browsing apparatus 100.

Main memory 112 provides CPU 104 with access to storage for data and code, including user interface 116, in a manner that is well-known and commonly used in computer systems. User interface 116 represents an operating system for the data browsing apparatus 100, and allows a user to request data files via hyperlinks presented on display 120.

While the above embodiment describes a dumb terminal acting as the data browsing apparatus 100, those skilled in the relevant art(s) will realize that the functionality described herein can be implemented in a wide variety of computer systems, including a multi-purpose computer running a web browser.

Figure 2:
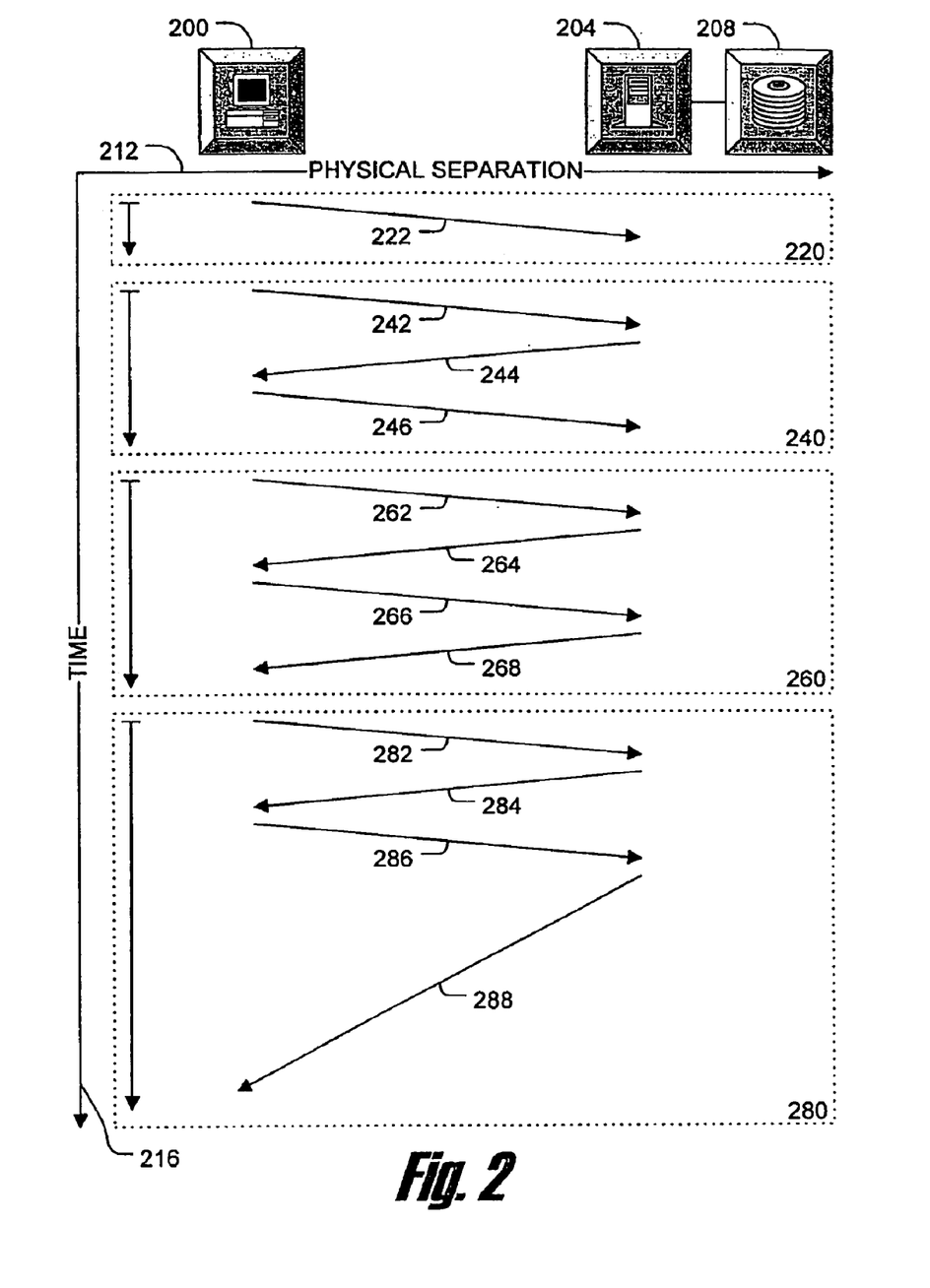
FIG. 2 is a graph illustrating four general situations in which the efficiency of a data browsing session can be improved according to a preferred embodiment of the present invention.

FIG. 2 is a graph illustrating four general situations in which the efficiency of a data browsing session can be improved according to a preferred embodiment of the present invention. Referring now to FIG. 2, a data browsing apparatus 200 is physically separated from, but in communicative contact with, a data server 204, as illustrated by a physical separation axis 212. Data server 204 is coupled with a database 208. A time axis 216 illustrates the directional flow of time in each of four situations 220, 240, 260 and 280.

In a first situation 220, a connection request 222 is generated by the data browsing apparatus 200 and transmitted to the data server 204, but no response is returned by the data server 204. This lack of response can be due to any number of reasons, including a temporary malfunction of data server 204 and a loss of connection request 222 during its traversal of physical separation 212. First situation 220 represents a case in which the present invention can be used to improve the efficiency of a data browsing session.

In a second situation 240, a connection request 242 is generated by the data browsing apparatus 200 and transmitted to the data server 204, a connection is established by a connection response 244 generated by the data server 204 and sent to the data browsing apparatus 200, a data request 246 is generated by the data browsing apparatus 200 and transmitted to the data server 204, but no response is returned by the data server 204. This lack of response can be due to any number of reasons, including a temporary malfunction of data server 204, a loss of data request 246 during its traversal of physical separation 212, and an unreasonable delay in delivery of data request 246 due to transient congestion of the communicative contact means between data browsing apparatus 200 and data server 204. Second situation 240 represents a case in which the present invention can be used to improve the efficiency of a data browsing session.

In a data browsing system in which data browsing apparatus 200 and data server 204 are maintained in a state of communicative connection as well as communicative contact, no connection request 222 or connection request 242 are needed. In this data browsing system, first situation 220 does not exist. Because first situation 220 and second situation 240 are handled in essentially the same manner, they will be treated as one situation, a lack of response situation, hereinafter.

In a third situation 260, a connection request 262 is generated by the data browsing apparatus 200 and transmitted to the data server 204, a connection is established by a connection response 264 generated by the data server 204 and sent to the data browsing apparatus 200, a data request 266 is generated by the data browsing apparatus 200 and transmitted to the data server 204, a denial response 268 is generated by the data server 204 and transmitted to the data browsing apparatus 200. The denial response 268 indicates that the refusal to deliver the requested data file is only temporary. For example, denial response 268 may indicate that the data request 266 has been accepted and is being processed, and the data server 204 will deliver the requested data file at a later time, or the denial response 268 may indicate that the data server 204 is temporarily unable to handle the data request 266, perhaps due to overloading or maintenance. Third situation 260 represents a case in which the present invention can be used to improve the efficiency of a data browsing session.

In a fourth situation 280, a connection request 282 is generated by the data browsing apparatus 200 and transmitted to the data server 204, a connection is established by a connection response 284 generated by the data server 204 and sent to the data browsing apparatus 200, a data request 286 is generated by the data browsing apparatus 200 and transmitted to the data server 204, and a data response 288 is returned. However, although data response 288 begins a download of the requested data file, the download is exceptionally slow, most likely due to congestion of the communicative contact means between data browsing apparatus 200 and data server 204. Fourth situation 280 represents a case in which the present invention can be used to improve the efficiency of a data browsing session.

Although FIG. 2 illustrates four general situations in which the present invention is applicable, it will be understood by those of skill in the relevant art(s) that the present invention is useful in any situation in which a data browsing session is delayed due to a temporary delay in delivery of a requested data file.

Figure 3A:
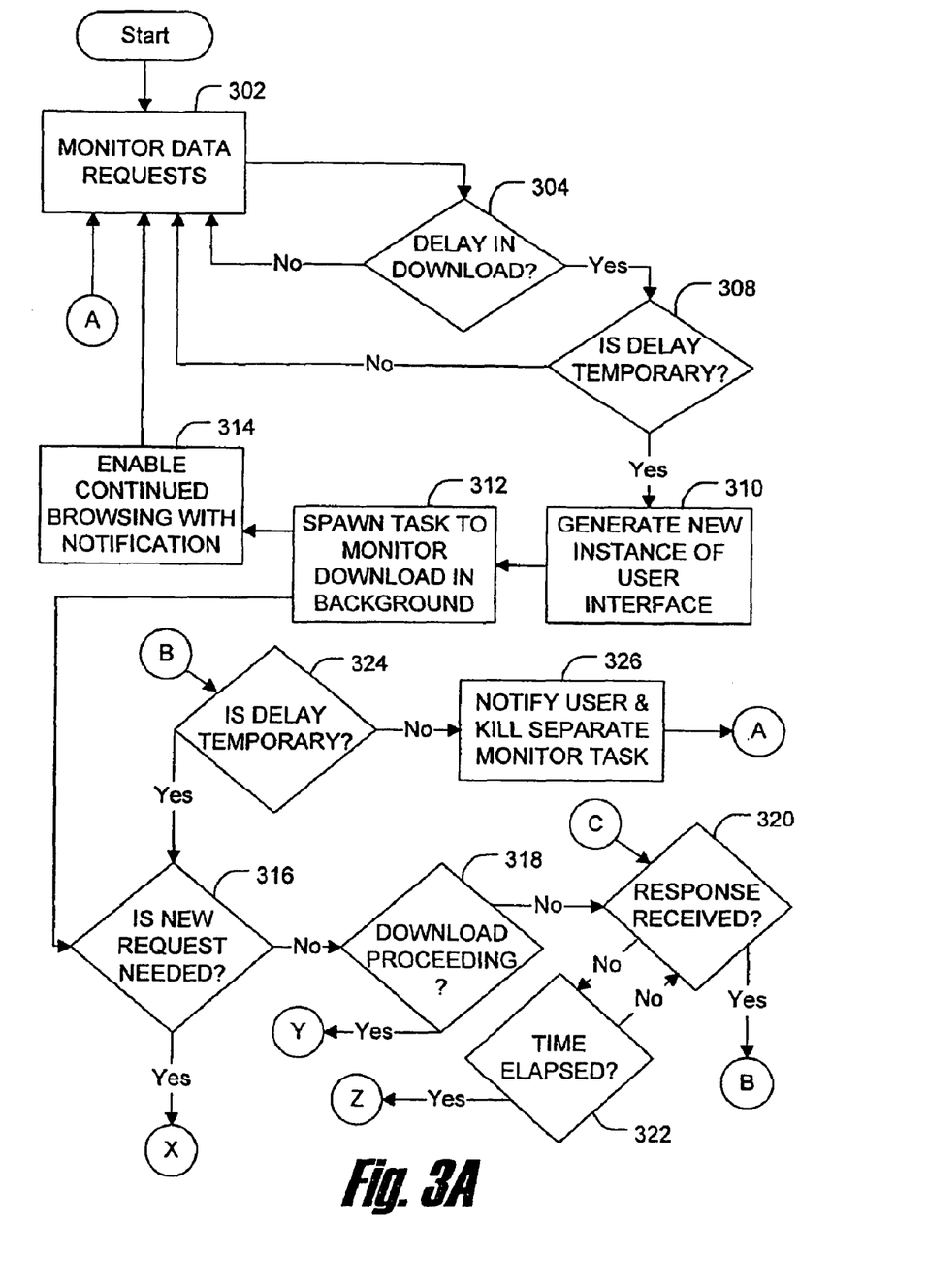
FIGS. 3A, 3B, 3C and 3D are a flow chart depicting a process, which enables efficient data browsing, according to a preferred embodiment of the present invention.

FIGS. 3A, 3B, 3C and 3D are a flow chart depicting a process, which enables efficient data browsing, according to a preferred embodiment of the present invention. Referring now to FIG. 3A, the process begins with step 302 in which data requests generated by the data browsing apparatus are monitored. In a preferred embodiment, the user of the data browsing apparatus is enabled to control the application of monitoring step 302.

For example, in one embodiment, the user can select and deselect an option that applies the monitoring step 302 universally to all data requests generated by the data browsing apparatus. In another exemplary embodiment, the user can individually select which data requests to which the monitoring step 302 is applied, such as by right clicking on a hyperlink, thereby opening a drop down menu that includes the two options, "Open Link with Background Option" and "Open Link in New Window with Background Option", or by clicking a special "Background Refresh" button on a tool bar. One skilled in the relevant art(s) will understand the wide range of options available for providing the user of the data browsing apparatus the ability to control the application of the monitoring step 302 given the disclosure herein.

In step 304, the process checks if a download of a data file requested by a data request being monitored in step 302 is delayed. The data request is identified as delayed in step 304 if any of three events occur: (1) no response is received within a reasonable time, (2) a response is received that indicates the requested data file will not be delivered immediately, or (3) a response is received that indicates the requested data file will be delivered, but the download of the requested data file is not completed within a reasonable time. When no delay is identified in step 304, control loops back to step 302. When a delay is identified in step 304, control passes to step 308.

In a preferred embodiment, the reasonable time frames for events one and two above are separately programmable by the user and have a default of six seconds. However, the reasonable time frames for alternative embodiments vary with the nature of the network and the network connection.

Step 308 checks if the delay is temporary. If the delay is not temporary, such as when access to the requested data is forbidden, control passes to step 302. If either event one ("no response") or event three ("slow download") have occurred, the delay is considered temporary, and control then passes to step 310. If event two ("denial response") has occurred, step 308 checks for a reason for the denial within the response received. Reasons that indicate a future request will result in delivery of the data file, such as "request accepted and being processed" or "service temporarily unavailable", are considered temporary, and control then passes to step 310. If no reason is given, this is also considered a temporary delay, and control passes to step 310.

In a preferred embodiment, the user of the data browsing apparatus is enabled to program which delays are considered temporary in step 308. In another embodiment, the data browsing apparatus is capable of downloading definitions of which delays are considered temporary, in step 308, from the network.

When the download delay is determined temporary in step 308, control passes to step 310 in which a new instance of the user interface is generated if needed. If the user has already created a new instance of the user interface as part of the data request, then an additional instance of the user interface is not needed, and step 310 is skipped. If a new instance of the user interface has not already been created, step 310 creates one in which to display the requested data file. In a preferred embodiment, the user can select an option by which step 310 is always skipped, thereby making an original instance of the user interface the place to display the requested data file once it is completely downloaded.

In an alternative embodiment, step 310 does not exist because there can only be one instance of the user interface. Thus, in this alternative embodiment, the single instance of the user interface will be used to display the requested data file once it is completely downloaded. In yet another alternative embodiment, step 310 does not exist because a new instance of the user interface in which to display the requested data file is only created if the requested data file is successfully downloaded.

Following step 310, control passes to step 312, in which a separate monitoring task is spawned to monitor the download of the requested data file in a background portion of the user interface. The background is a process space in which the functionality described in steps 312 to 382 (excluding the notifying steps) is carried out without the user being actively aware of the functions being performed. This spawned monitoring task can be an actual separate process or multi-tasking functionality built into the process disclosed herein. If a new instance of the user interface was created by step 310, or by the data request, this new instance is used to display the progress of the download performed by the separate monitoring task. Those of skill in the relevant art(s) will understand how to implement this separate monitoring task given the disclosure herein.

Following step 312, control passes to step 314 in which continued data browsing is enabled and the user is notified of the spawned monitoring task performing the download in the background. If a new instance of the user interface has been created, the original instance of the user interface is brought to the foreground and placed under the user's active control in step 314. In a preferred embodiment, the user is enabled to switch between observing the continued data browsing task or the spawned monitoring task.

Also following step 312, control of the spawned monitoring task passes to step 316 in which the process checks whether a new data request is needed. If the data request resulted in a denial response, control passes to step 380 on FIG. 3D. Otherwise, control passes to step 318.

In step 318, the process checks whether a download is currently proceeding. If so, control passes to step 360 on FIG. 3C. Otherwise, control passes to step 320.

In step 320, the process checks whether a response has been received. If not, control passes to step 322 in which the process checks whether a specified time has elapsed. The specified time allows the process to stop waiting for a response in the no response case, thereby avoiding the risk of an endless loop caused by a lost data request. In a preferred embodiment, the specified time varies with the number of data requests sent to a particular data server. While a response has not been received and the specified time has not elapsed, the process stays in steps 320 and 322. If the specified time elapses before a response is received, this situation is identified in step 322, and control passes to step 340 on FIG. 3B. If a response is received before the specified time elapses, this situation is identified in step 320, and control passes to step 324.

In step 324, the process checks the response to determine if a temporary delay continues to exist. If the response indicates that the requested data file is now being delivered, control passes back to step 316. If the response indicates that the requested data file will not be delivered immediately, step 324 checks for a reason for the denial within the response. Reasons that indicate a future request will result in delivery of the data file, such as "request accepted and being processed" or "service temporarily unavailable", are considered temporary, and control then passes back to step 316. If no reason is given, this is also considered a temporary delay, and control passes back to step 316. If the delay is not temporary, such as when access to the requested data is forbidden, control passes to step 326.

In a preferred embodiment, the user of the data browsing apparatus is enabled to program which responses are considered continuing delays in step 324. In another embodiment, the data browsing apparatus is capable of downloading definitions of which responses are considered continuing delays, in step 324, from the network.

In step 326, the user is notified of the failure to obtain the requested download, and the separate monitoring task is terminated. If a new instance of the user interface was created in which to display the requested data file, this new instance is brought to the foreground and given active control in step 326. However, in a preferred embodiment, the user can disable this functionality, and also program the present invention to eliminate the new instance of the user interface in step 326, if that new instance was created by step 310.

Figure 3B:
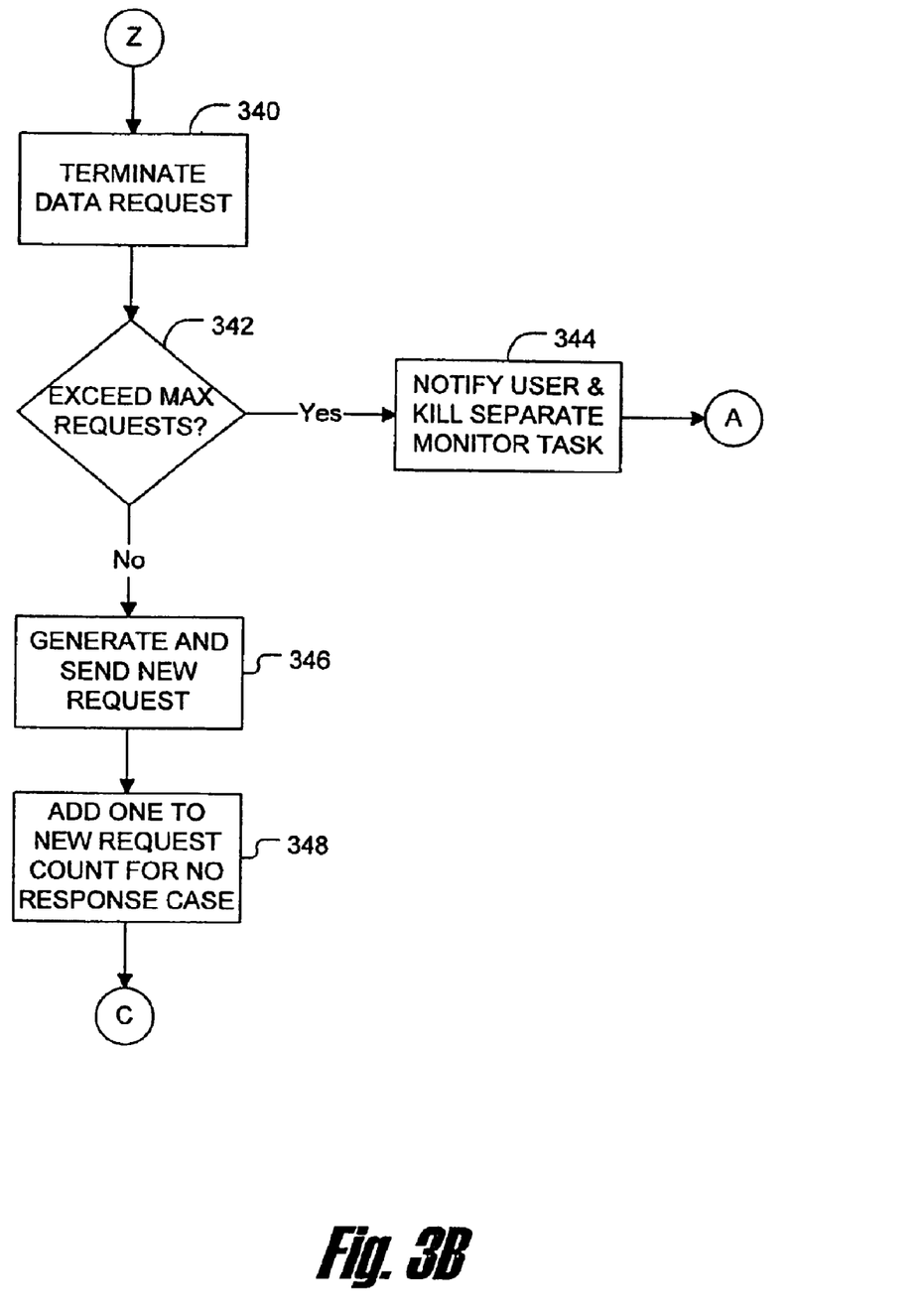

Referring now to FIG. 3B, step 340 is reached when step 322 identifies the situation in which the specified time for a response elapses before a response is received. In step 340, the process terminates the data request by sending a termination request to the particular data server. In an alternative embodiment, step 340 is unnecessary because the data request and each new data request for the data file are monitored by the separate monitoring task, thus as soon as a response is received, this response is processed and later received responses are ignored.

In step 342, the process checks whether a maximum number of new requests has been exceeded without a response. If so, control passes to step 344. If not, control passes to step 346 in which a new request for the data file is generated and sent to the particular data server. Following step 346, the process adds one to the new request count for the no response case, before returning to step 320 on FIG. 3A.

In a preferred embodiment, the maximum number of new requests used in step 342 is programmable by the user.

When step 344 is reached from step 342, the user is notified of the failure to obtain the requested download due to the lack of response from the particular data server, and the separate monitoring task is terminated. If a new instance of the user interface was created in which to display the requested data file, this new instance is brought to the foreground and given active control in step 344. However, in a preferred embodiment, the user can disable this functionality, and also program the present invention to eliminate the new instance of the user interface in step 344, if that new instance was created by step 310.

Figure 3C:
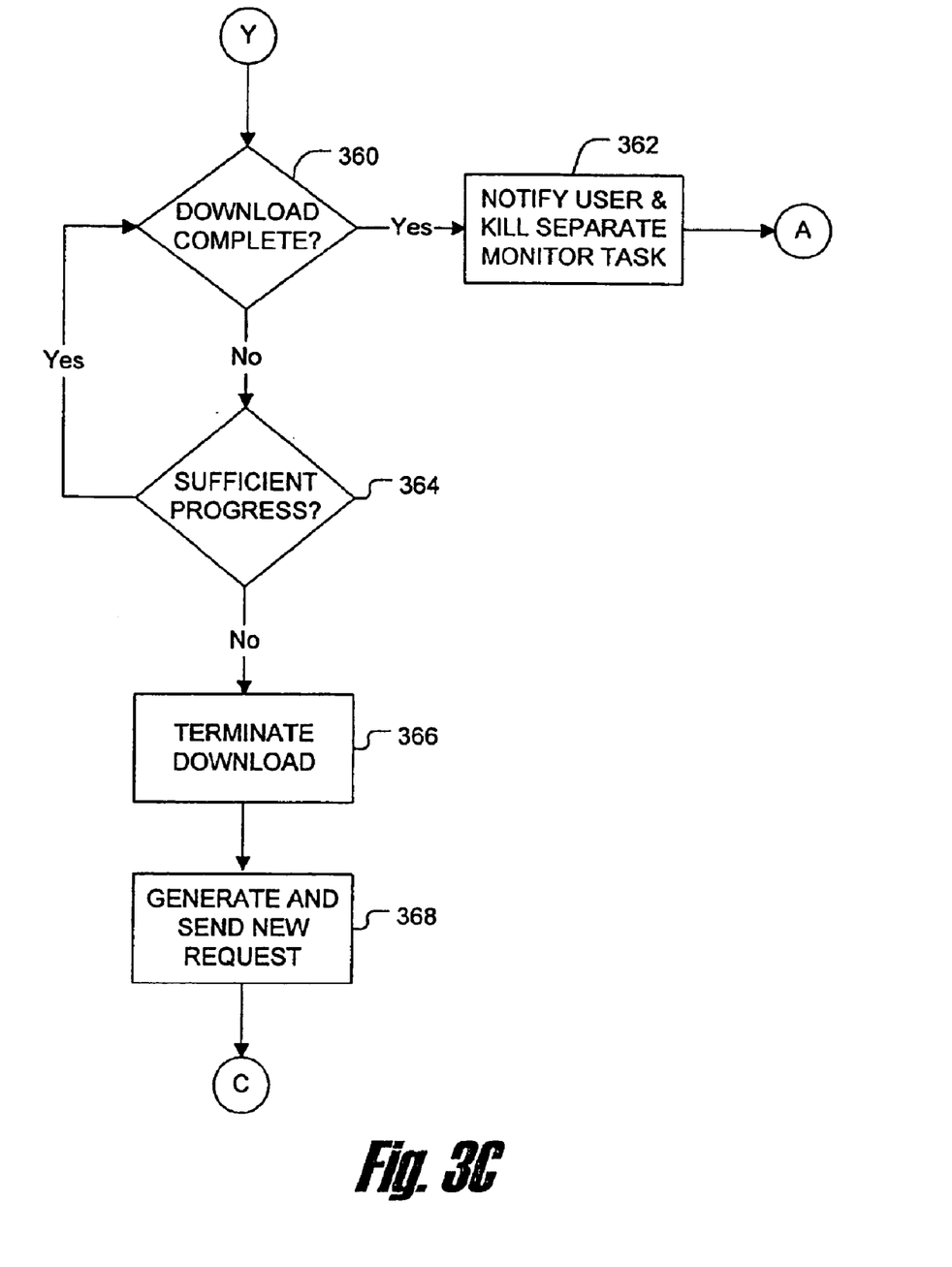

Referring now to FIG. 3C, step 360 is reached when step 318 determines that a download is currently proceeding. In step 360, the process checks whether the download is complete. If so, control passes to step 362. If not, control passes to step 364. In step 364, the process checks the progress of the download. If the download is progressing with sufficient alacrity, control passes back to step 360. Otherwise, control passes to step 366. Thus, steps 360 and 364 function as a monitor of the speed of the download.

When the download is progressing too slowly, this is identified in step 364 and control passes to step 366 in which the download is terminated. Following step 366, a new request for the data file is generated and sent to the particular data server in step 368, before control returns to step 320 on FIG. 3A.

Steps 364 through 368 are designed to handle a common situation on IP computer networks in which the packets of a data stream have chosen a poor route through the network due to a transient network anomaly. When this occurs, it is often better to terminate an existing download and re-request the same data. However, in alternative embodiments of the present invention, steps 364 through 368 are unnecessary, and the process simply waits in step 360 until the download is complete, before progressing to step 362.

In another embodiment of the present invention in which steps 364 through 368 are used, the process checks in step 368 whether the requested data file consists of discrete sub-elements. If so, step 368 identifies which discrete sub-elements have not yet been received, and the new request generated and sent in step 368 is actually one or more new requests for the discrete sub-elements so identified.

In step 362, the user is notified of the successful download, and the separate monitoring task is terminated. If a new instance of the user interface was created in which to display the requested data file, this new instance is brought to the foreground and given active control in step 362, thereby displaying the requested data file. If no new instance of the user interface was created, step 362 notifies the user of the successful download by displaying the data file via the user interface, or alternatively, by providing an option to display the data file via the user interface. In another alternative embodiment in which no new instance of the user interface has yet been created, step 362 notifies the user of the successful download by creating a new instance of the user interface, displaying the data file therein, and either brings the new instance of the user interface to the foreground with active control or not.

Figure 3D:
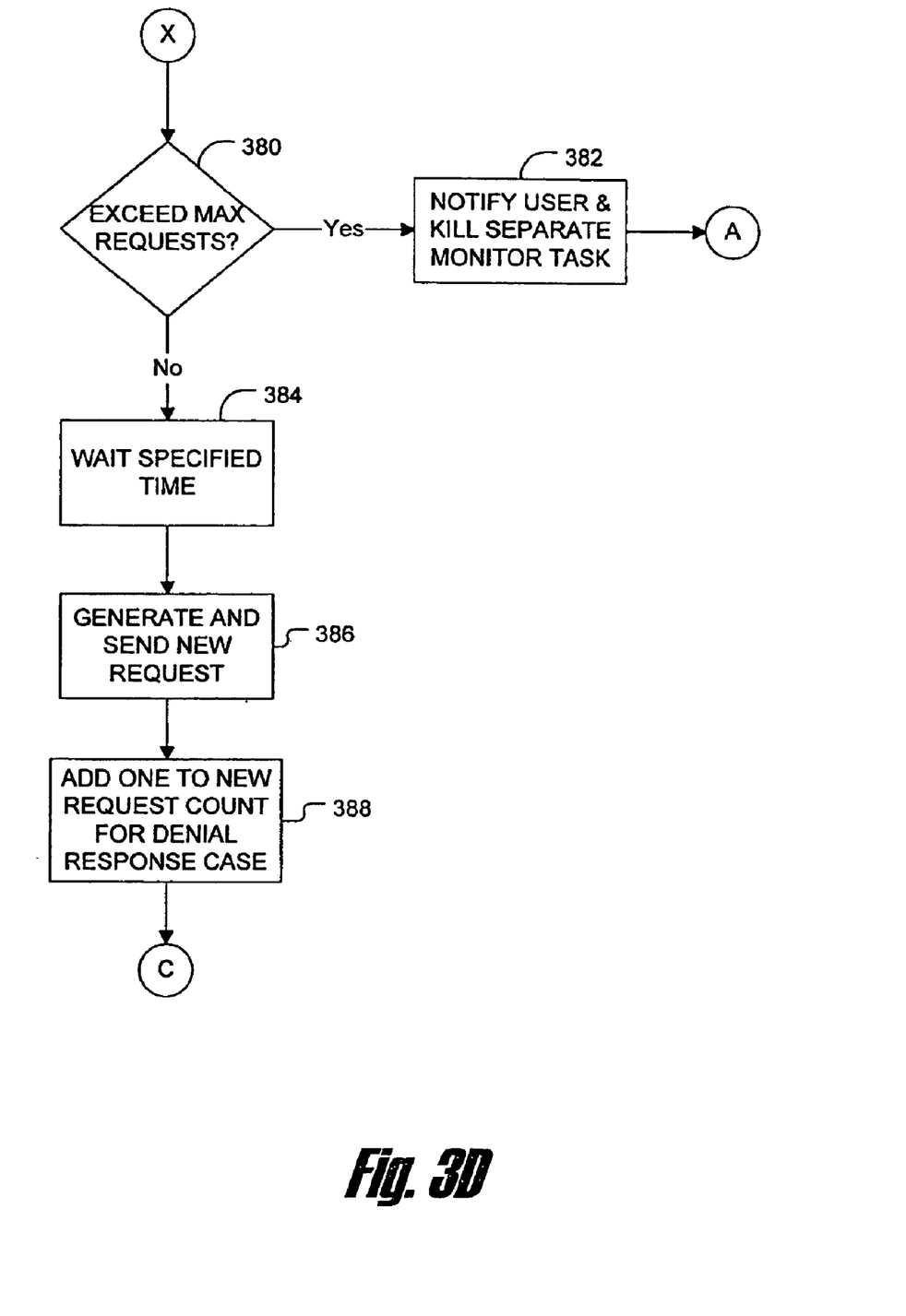

Referring now to FIG. 3D, step 380 is reached when step 316 determines that a new data request is needed. In step 380, the process checks whether a maximum number of new requests after a denial response has been exceeded. If so, control passes to step 382. If not, control passes to step 384 in which a variable time is allowed to pass before proceeding to step 386. If the response received specified a time after which to re-request the data file, the variable time is set to that specified time. Otherwise, the variable time increases with the number of new requests that have already been generated in response to successive denial responses. In a preferred embodiment, the variable time increases exponentially to reduce network traffic and avoid repetitive overloading of the particular data server. Also in a preferred embodiment, the maximum number of new requests after a denial response is programmable by the user.

After step 384, a new request for the data file is generated and sent to the particular data server in step 386. Following step 386, the process adds one to the new request count for the denial response case, before returning to step 320 on FIG. 3A.

When step 382 is reached from step 380, the user is notified of the failure to obtain the requested download due to excessive denial responses from the particular data server, and the separate monitoring task is terminated. If a new instance of the user interface was created in which to display the requested data file, this new instance is brought to the foreground and given active control in step 382. However, in a preferred embodiment, the user can disable this functionality, and also program the present invention to eliminate the new instance of the user interface in step 382, if that new instance was created by step 310.

Figure 4:
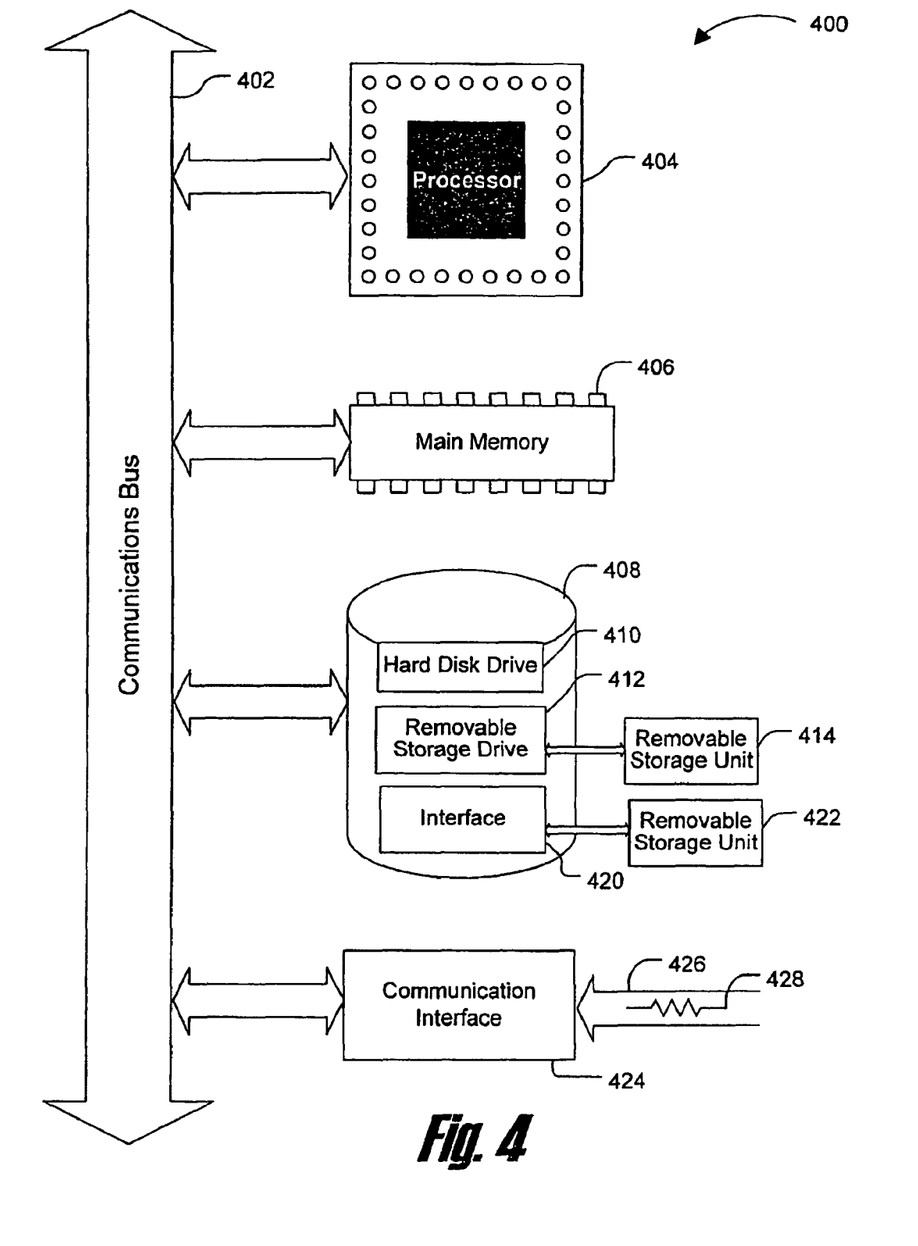
FIG. 4 is a block diagram illustrating an example computer system in which elements and functionality of the invention are implemented according to one embodiment of the present invention.

FIG. 4 is a block diagram illustrating an example computer system in which elements and functionality of the invention are implemented according to one embodiment of the present invention. The present invention may be implemented using hardware, software or a combination thereof and may be implemented in a computer system or other processing system. An exemplary computer system 400 is shown in FIG. 4. Various software embodiments are described in terms of this exemplary computer system 400. After reading this description, it will become apparent to a person having ordinary skill in the relevant art(s) how to implement the invention using other computer systems and/or computer architectures.

Referring now to FIG. 4, the computer system 400 includes one or more processors, such as processor 404. Additional processors may be provided, such as an auxiliary processor to manage input/output, an auxiliary processor to perform floating point mathematical operations, a digital signal processor (a special-purpose microprocessor having an architecture suitable for fast execution of signal processing algorithms), a back-end processor (a slave processor subordinate to the main processing system), an additional microprocessor or controller for dual or multiple processor systems, or a coprocessor. It will be recognized that such auxiliary processors may be discrete processors or may be built in to the processor 404.

The processor 404 is connected to a communication bus 402. The communication bus 402 may include a data channel for facilitating information transfer between storage and other peripheral components of the computer system 400. The communication bus 402 further provides the set of signals required for communication with the processor 404, including a data bus, address bus, and control bus (not shown). The communication bus 402 may comprise any known bus architecture according to promulgated standards, for example, industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPIB), IEEE 696/S-100, and the like.

Computer system 400 includes a main memory 406 and may also include a secondary memory 408. The main memory 406 provides storage of instructions and data for programs executing on the processor 404. The main memory 406 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, as well as read only memory (ROM).

The secondary memory 408 may include, for example, a hard disk drive 410 and/or a removable storage drive 412, representing a floppy disk drive, a magnetic tape drive, an optical disk drive, etc. The removable storage drive 412 reads from and/or writes to a removable storage unit 414 in a well-known manner. Removable storage unit 414, represents a floppy disk, magnetic tape, optical disk, etc. which is read by and/or written to by removable storage drive 412. As will be appreciated, the removable storage unit 414 includes a computer usable storage medium having stored therein computer software and/or data.

In alternative embodiments, secondary memory 408 may include other similar means for allowing computer programs or other instructions to be loaded into the computer system 400. Such means may include, for example, a removable storage unit 422 and an interface 420. Examples of such include semiconductor-based memory such as programmable read-only memory (PROM), erasable programmable read-only memory (EPROM), electrically erasable read-only memory (EEPROM), or flash memory (block oriented memory similar to EEPROM). Also included are any other removable storage units 422 and interfaces 420, which allow software and data to be transferred from the removable storage unit 422 to the computer system 400.

Computer system 400 also includes a communications interface 424. Communications interface 424 allows software and data to be transferred between computer system 400 and external devices, networks or information sources. Examples of communications interface 424 include a modem, a network interface (such as an Ethernet card), a communications port, a PCMCIA slot and card, etc. Communications interface 424 preferably implements industry promulgated architecture standards, such as Ethernet IEEE 802 standards, Fibre Channel, digital subscriber line (DSL), asymmetric digital subscriber line (ASDL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on. Software and data transferred via communications interface 424 are in the form of signals which can be electronic, electromagnetic, optical or other signals capable of being received by communications interface 424. These signals 428 are provided to communications interface 424 via a channel 426. This channel 426 carries signals 428 and can be implemented using wire or cable, fiber optics, a phone line, a cellular phone link, a radio frequency (RF) link, infrared interface (IR) or other communications channels.

Computer programming instructions (also known as computer programs or software) are stored in the main memory 406 and/or the secondary memory 408. Computer programs can also be received via communications interface 424. Such computer programs, when executed, enable the computer system 400 to perform the features of the present invention as discussed herein. In particular, the computer programs, when executed, enable the processor 404 to perform the features and functions of the present invention. Accordingly, such computer programs represent controllers of the computer system 400.

In this document, the term "computer program product" is used to refer to any media used to provide programming instructions to the computer system 400. Examples of these media include removable storage drive 412, a hard disk installed in hard disk drive 410, and signals 428. These computer program products are means for providing programming instructions to the computer system 400.

In an embodiment where the invention is implemented using software, the software may be stored in a computer program product and loaded into computer system 400 using hard drive 410, removable storage drive 412, interface 420 or communications interface 424. The software, when executed by the processor 404, causes the processor 404 and/or system 400 to perform the features and functions of the invention as described herein.

In another embodiment, the invention is implemented primarily in hardware using, for example, hardware components such as application specific integrated circuits ("ASICs"). Implementation of the hardware state machine so as to perform the functions described herein will be apparent to persons having ordinary skill in the relevant art(s).

In yet another embodiment, the invention is implemented using a combination of both hardware and software. It should be appreciated that modification or reconfiguration of the computer system 400 of FIG. 4 by one having ordinary skill in the relevant art(s) will not depart from the scope or the spirit of the present invention.

While various embodiments of the present invention have been described above, it should be understood that they have been presented by way of example only, and not limitation. It is to be understood that the description and drawings represent the presently preferred embodiment of the invention and are, as such, representative of the subject matter which is broadly contemplated by the present invention. Furthermore, the scope of the present invention fully encompasses other embodiments that may become obvious to those skilled in the art. Thus, the breadth and scope of the present invention should not be limited by any of the above-described exemplary embodiments, but should be defined only in accordance with the following claims and their equivalents.

I claim:

1. In a computer controlled data browsing apparatus having a display, a user interface and a computer-network interface, the computer controlled data browsing apparatus being for use by a user and being capable of browsing hyperlinked data, a method for data browsing comprising the steps of:

enabling the user to specify at least one characteristic for monitoring data requests;

monitoring data requests generated via the user interface and transmitted via the computer-network interface, said monitoring step performed such that, when a download of a data file, requested by a file request being one of the data requests, is temporarily delayed, the data file is identified as currently unavailable;

backgrounding the download of the data file identified as currently unavailable in said monitoring step, said backgrounding step occurring automatically upon the data file being identified as currently unavailable in said monitoring step, and whereby said backgrounding step enables immediate continued browsing of data already made observable by the data requests; and making the data file available to the user via the user interface once the download of the data file is completed.

2. The method of claim 1 wherein said enabling step further comprises enabling the user to select to monitor all data requests in said monitoring step.

3. The method of claim 1 wherein said enabling step further comprises enabling the user to individually select which data requests to monitor in said monitoring step.

4. The method of claim 3 wherein selection of which data requests to monitor is initiated by right clicking on a link associated with the data file to be downloaded.

5. The method of claim 1 wherein said enabling step further comprises enabling the user to determine which types of delays in downloading data files are considered temporary.

6. The method of claim 1 wherein said enabling step further comprises enabling the user to download definitions of which types of delays are considered temporary.

7. In a computer controlled data browsing apparatus having a display, a user interface and a computer-network interface, the computer controlled data browsing apparatus being for use by a user and being capable of browsing hyperlinked data, a method for data browsing comprising the steps of:

monitoring data requests generated via the user interface and transmitted via the computer-network interface, said monitoring step performed such that, when a download of a data file, requested by a file request being one of the data requests, is temporarily delayed, the data file is identified as currently unavailable;

backgrounding the download of the data file identified as currently unavailable In said monitoring step, said backgrounding step occurring automatically upon the data file being identified as currently unavailable in said monitoring step, and whereby said backgrounding step enables immediate continued browsing of data already made observable by the data requests; and making the data file available to the user via the user interface once the download of the data file is completed, said making step including generating a new instance of the user interface in which to display the data file if needed.

8. The method of claim 7 wherein said generating step is not needed if the user has created a new instance of the user interface as part of the data request for the data file identified as being currently unavailable.

9. The method of claim 7 further comprising the step of providing the user with the option to select to skip the step of generating a new instance of the user interface for displaying the data file identified as being currently unavailable.

10. The method of claim 7 wherein said generating step is needed only if downloading of the data file identified as being currently unavailable is successfully completed.

11. The method of claim 7 wherein progress of downloading the data file is displayed on the new instance of the user interface.

12. The method of claim 7 wherein said generating step further comprise, the step of bringing an original instance of the user interface to the foreground after the new instance of the user interface is generated.

13. In a computer controlled data browsing apparatus having a display, a user interface and a computer-network interface, the computer controlled data browsing apparatus being for use by a user and being capable of browsing hyperlinked data, a method for data browsing comprising the steps of:

monitoring data requests generated via the user interface and transmitted via the computer-network interface, said monitoring step performed such that, when a download of a data file, requested by a file request being one of the data requests, is temporarily delayed, the data file is identified as currently unavailable;

backgrounding the download of the data file identified as currently unavailable in said monitoring step, said backgrounding step occurring automatically upon the data file being identified as currently unavailable in said monitoring step, and whereby said backgrounding step enables immediate continued browsing of data already made observable by the data requests; and requesting the data file in a continuing fashion when download of the data file is temporarily delayed such that additional data requests for the data file are generated as needed.

14. The method of claim 13 further comprising the step of making the data file available to the user via the user interface once the download of the data file is completed.

15. The method of claim 13 wherein said requesting Step is performed after a period of time has elapsed without a response.

16. The method of claim 15 wherein the period of time varies with a number of additional data requests having been sent.

17. The method of claim 13 wherein said requesting step further comprises the step of enabling the user to select a maximum number of additional data requests to be sent in a continuing fashion.

18. The method of claim 17 further comprising the step of notifying the user when the maximum number of additional requests have been sent without the data file being downloaded.

19. The method of claim 17 further comprising the step of generating a new instance of the user interface in which to display the data file when the data file is identified as being currently unavailable, and eliminating the new instance of the user interface when the maximum number of additional requests have been sent without the download of the data file being completed.

20. The method of claim 13 wherein said requesting step further comprises the steps of determining if the data file includes discrete sub-elements, and if so, determining which sub-elements have not been received, and generating requests for the sub-elements that have not been received.

* * * * *